US012608130B2

(12) United States Patent
Oberberger et al.

(10) Patent No.: US 12,608,130 B2
(45) Date of Patent: Apr. 21, 2026

(54) COMPACTED MEMORY TRANSACTIONS FOR LOCAL DATA SHARES

(71) Applicant: ADVANCED MICRO DEVICES, INC., Santa Clara, CA (US)

(72) Inventors: Max Oberberger, Munich (DE); Matthaeus G. Chajdas, Munich (DE)

(73) Assignee: Advanced Micro Devices, In., Santa Clara, CA (US)

( * ) Notice: Subject to any disclaimer, the term of this patent is extended or adjusted under 35 U.S.C. 154(b) by 50 days.

(21) Appl. No.: 18/538,930

(22) Filed: Dec. 13, 2023

(65) Prior Publication Data

US 2025/0199688 A1      Jun. 19, 2025

(51) Int. Cl.
G06F 3/06 (2006.01)

(52) U.S. Cl.
CPC .......... G06F 3/0613 (2013.01); G06F 3/0659 (2013.01); G06F 3/0673 (2013.01)

(58) Field of Classification Search
CPC .... G06F 3/0613; G06F 3/0608; G06F 3/0659; G06F 3/0673; G06F 9/3824; G06F 9/3858; G06F 9/3887; G06F 9/38; G06F 15/80; G06F 15/8061; G06F 15/8069; G06F 15/8076; G06F 15/8084
See application file for complete search history.

(56) References Cited

U.S. PATENT DOCUMENTS

| | | | | |
|---|---|---|---|---|
| 2018/0276027 A1* | 9/2018 | Khare | ..................... | G06F 9/461 |
| 2020/0342632 A1* | 10/2020 | Frumkin | ................ | G06T 9/002 |
| 2021/0224191 A1* | 7/2021 | Wang | .................. | G06F 12/0813 |
| 2021/0349717 A1* | 11/2021 | Gurram | .............. | G06F 9/38885 |
| 2023/0185570 A1* | 6/2023 | Kerr | ................... | G06F 12/0888 712/225 |
| 2024/0220259 A1* | 7/2024 | Tohara | ................ | G06F 9/30038 |

* cited by examiner

*Primary Examiner* — Tracy A Warren

(57)      ABSTRACT

To load compacted memory between a system memory and a local data share (LDS), a processing system includes an accelerator unit (AU) connected to a memory unit. The memory unit is configured to identify that compacted data in the system memory is to be written to elements of an LDS based on two or more compaction masks. The memory unit is configured to then determine sources within the memory from which to load compacted data into the elements of the LDS by determining pre-fix sums based on the two or more compaction masks. The memory unit is configured to then load the compacted data from the identified sources to corresponding elements of the LDS.

20 Claims, 8 Drawing Sheets

800

RECEIVE INSTRUCTIONS — 805

RETRIEVE COMPACTION MASK AND COMPACTED DATA FOR EACH WAVE TO BE CONCURRENTLY LAUNCHED — 810

COMBINE COMPACTION MASKS AND DETERMINE COMPACTED DATA TO WRITE — 815

DETERMINE PREFIX SUMS FOR COMBINED COMPACTION MASK — 820

STORE DATA IN LDS BASED ON PREFIX SUMS AND COMBINED COMPACTION MASK — 825

COMPACTED MEMORY TRANSACTIONS FOR LOCAL DATA SHARES

BACKGROUND

To execute applications, some processing systems include graphical processing units (GPUs) configured to execute threads each including groups of work items for the application. To this end, these GPUs include single instruction, multiple data (SIMD) units each configured to execute one or more of these threads. After executing a thread, some SIMD units then write data resulting from the execution of the thread in a data structure stored in a local memory shared across two or more of the SIMD units, wherein the data structure includes, for each thread, at least one corresponding element. Once data resulting from the execution of one or more threads is written to the local memory, the GPU then writes the data from the data structure in the local memory to a system memory for later use. However, based on the applications being executed by the processing system, not every SIMD unit executing threads is configured to write data to the data structure in the local memory, resulting in the data structure having empty elements. Additionally, when the data structure is copied to the system memory, these empty elements are also copied, which results in data structures with empty elements being stored in the system memory.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
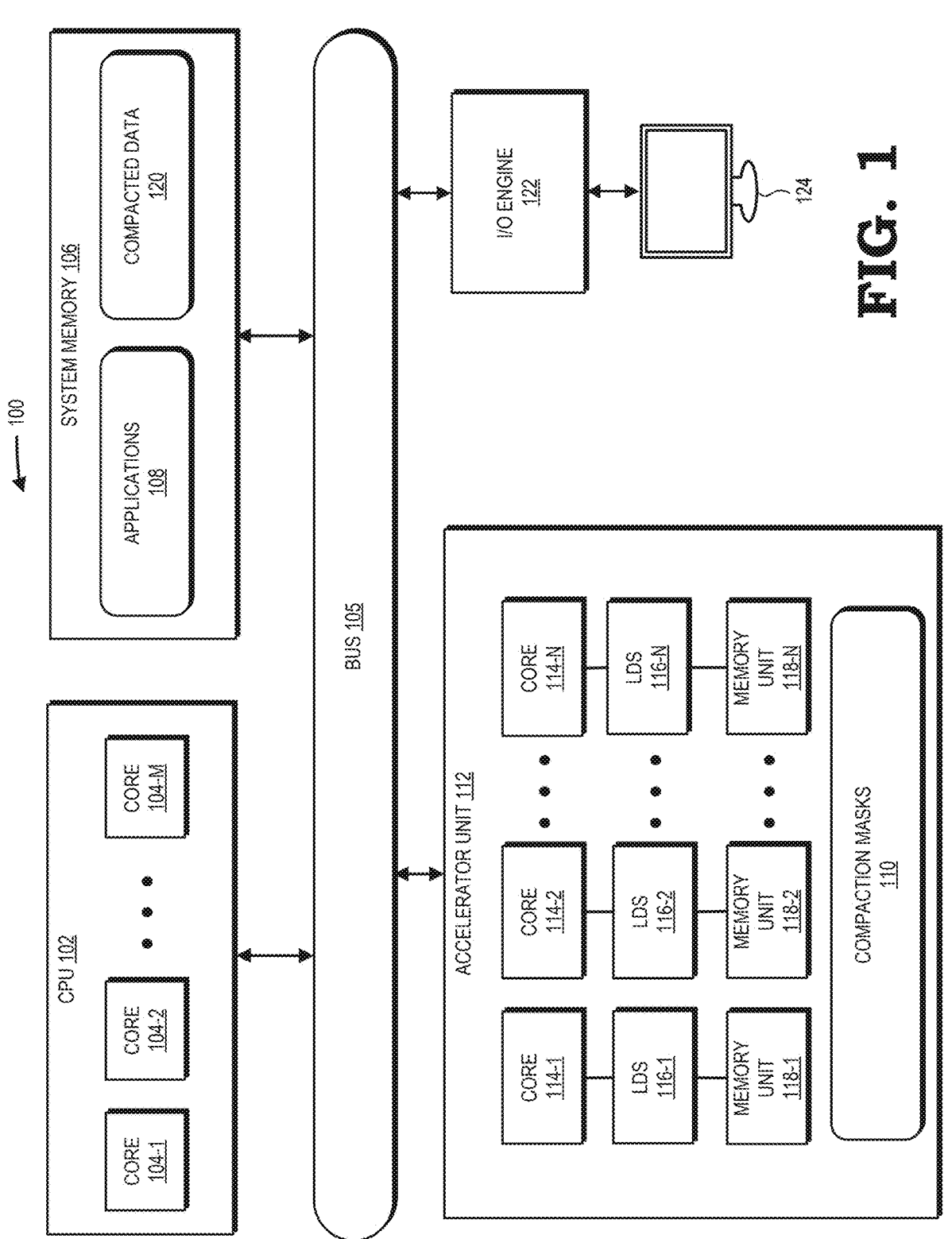
FIG. 1 is a block diagram illustrating a processing system configured for compacted memory transactions for local data shares (LDSs), in accordance with some embodiments.

To execute an application, some processing systems include a system memory configured to store instructions and data for the application. Such data, for example, includes variables, operands, constants, results (e.g., data resulting from the performance of an instruction or operation), and the like used to execute the instructions for the application. To execute these instructions, some processing systems include one or more accelerator units (AUs) configured to execute instructions, operations, or both for the application. As an example, an AU includes one or more compute units configured to perform multiple operations for the instructions concurrently. These compute units, for example, are configured to execute groups of threads (e.g., work items), referred to herein as "waves," as indicated in the instructions. To this end, the compute units include one or more single instruction, multiple data (SIMD) units each configured to perform operations for one or more threads of the waves indicated in the received instructions. To help the SIMD units of a compute unit perform operations for the threads, a compute unit includes or is otherwise connected to a respective local data share (LDS) configured to store data necessary for, aiding in, or helpful for the performance of the operations. As an example, a compute unit includes a memory unit configured to retrieve variables, operands, constants, results, or any combination thereof associated with the application from the system memory and then store the retrieved variables, operands, constants, results, or any combination thereof in the LDS of the compute unit. The SIMD units then use the retrieved variables, operands, constants, results, or any combination as stored in the LDS to perform the operations.

After performing one or more operations, a SIMD unit is configured to store the data resulting from the performance of the operations (e.g., the results) in the LDS connected to the SIMD unit. For example, the LDS includes a data structure (e.g., matrix) configured to store the results for each thread executed by the SIMD units connected to the LDS. To this end, the processing system is configured to allocate respective portions of the LDS (e.g., respective portions of a matrix) to each thread executed by the compute units such that each thread has a respective portion of the LDS in which to store a result. Once the results are written to the LDS, the memory unit then stores the results in a data structure (e.g., matrix) within the system memory, by, for example, performing one or more memory transactions. As an example, the memory unit writes the data in each portion of the LDS (e.g., in a data structure of the LDS) allocated to an executed thread to a matrix in the system memory. However, some threads executing on the SIMD units are configured to not provide a result to the LDS, to provide results to the LDS not required for the execution of further waves, or both. Based on a thread not providing a result to the LDS or providing a result to the LDS not required for the execution of further waves, the data structure (e.g., matrix) in the LDS allocated to store the results of the threads includes one or more empty elements. The memory unit then writes such a data structure including one or more empty elements to the system memory. Due to the data structure in the system memory having one or more empty elements, the data structure has a larger footprint than required to indicate the results of the executed threads, increasing the system memory usage needed to execute the threads.

To this end, systems and techniques disclosed herein are directed to compacted memory transactions for LDSs. For example, a processing system includes an AU having one or more compute units configured to receive a set of instructions from an application. The set of instructions, for example, indicates one or more waves to be performed by the compute units of the AU. To execute these waves, each compute unit includes a memory unit configured to compact data as the data is transferred from one or more LDSs to the system memory and to decompact data as the data is transferred from the system memory to the LDSs. As an example, a compute unit first receives a set of instructions indicating two or more waves to be concurrently performed and indicating a respective compaction mask for each of the waves. A compaction mask, for example, indicates whether compacted data is to be transferred between the system memory and an LDS for each thread of a wave. As an example, a compaction mask includes a number of bits with each bit indicating whether compacted data is to be transferred between the system memory and an LDS for a corresponding thread of a wave. After the compute unit receives the set of instructions indicating the compaction masks for the waves, the memory unit stores the compaction masks in one or more registers of the memory unit.

To write data from the LDS as compacted data in the system memory, the memory unit first retrieves the corresponding compaction mask for each wave having results stored in the LDS and combines the retrieved compaction masks to produce a combined compaction mask. For example, the memory unit combines a first compaction mask for a first wave with a second compaction mask with a second front to produce a combined compaction mask including a number of elements (e.g., bits) each indicating whether a corresponding thread of the first or second waves is to have compacted data transferred between the LDS and the system memory. Based on the combined compaction mask, the memory unit then identifies which threads of the waves are to have compacted data transferred between the LDS and the system memory. As an example, based on a bit of the combined compaction mask associated with a thread of a wave having a first value (e.g., 1), the memory unit determines that the thread is to have compacted data transferred between the LDS and the system memory. The memory unit then only writes data from the portions of the LDS assigned to the identified threads (e.g., threads that are to have compacted data transferred between the LDS and the system memory) to a data structure (e.g., matrix) in the system memory.

To determine the locations within the system memory to write the data from the portions LDS assigned to the identified threads, the memory unit computes a respective prefix sum for each element (e.g., bit) of the combined compaction mask indicating that a corresponding thread is to have compacted data transferred between the LDS and the system memory. As an example, for each element of the data structure in the LDS assigned to a respective identified thread, the memory unit determines a destination in the system memory based on the prefix sum determined for a corresponding element of the combined compaction mask indicating that the respective identified thread is to have compacted data transferred between the LDS and the system memory. As an example, for an element of the data structure in the LDS assigned to a first identified thread, the memory unit determines a destination in the system memory based on the prefix sum determined for the respective element of the combined compaction mask indicating that the first identified thread is to have data transferred between the LDS and the system memory. After determining the corresponding destinations in the system memory for one or more elements of the data structure in the LDS, the memory unit then writes the data in those elements of the data structure in the LDS to their corresponding destinations in the system memory. For example, the memory unit generates one or more memory transactions so as to write data from the portions of the LDS assigned to the identified threads to the destinations in the system memory.

Further, the memory unit is configured to write compacted data from the system memory to a data structure (e.g., matrix) within an LDS such that each element of the data structure corresponds to a thread of a wave to be concurrently executed by the compute units. As an example, the memory unit is configured to write, to a data structure in an LDS, compacted data necessary for, aiding in, or helpful for the execution of the threads of one or more waves. To this end, the memory unit first retrieves the compaction mask for each wave to be concurrently executed by the compute units and combines the retrieved compaction masks to produce a combined compaction mask. For example, the memory unit combines a first compaction mask for a first wave with a second compaction mask with a second front to produce a combined compaction mask including a number of elements (e.g., bits) each indicating whether a corresponding thread of the first or second waves is to have compacted data transferred between the LDS and the system memory. Based on the combined compaction mask, the memory unit then identifies a number of elements storing compacted data (e.g., a number of elements in a data structure storing compacted data) in the system memory from which to write compacted data to the LDS.

As an example, the memory unit first determines the number of elements in the combined compaction mask that include data (e.g., a bit) indicating that a corresponding thread is to have compacted data transferred between the LDS and the system memory. The memory unit then identifies a number of elements in the system memory equal to the number of elements in the combined compaction mask that include data (e.g., a bit) indicating that a corresponding thread is to have compacted data transferred between the LDS from which to write compacted data to the LDS. After identifying the number of elements in the system memory from which to write compacted data to the LDS, the memory unit then determines a respective destination within the LDS to write the data from the elements in the system memory based on the combined compaction mask. For example, for each element (e.g., bit) of the combined compaction mask indicating that a corresponding thread is to have data transferred between the LDS and the system memory, the memory unit computes a respective prefix sum. For the data in an Nth block in the system memory, the memory unit determines a destination in the LDS based on the prefix sum determined for the Nth element of the combined compaction mask indicating that a corresponding thread is to have compacted data transferred between the LDS and the system memory. As an example, for the data in a first block of the system memory, the memory unit determines a destination in the LDS based on the prefix sum determined for the first element of the combined compaction mask indicating that a corresponding thread is to have data transferred between the LDS and the system memory. After determining the corresponding destination in the LDS for the data in one or more elements of the system memory, the memory unit then writes the data in the elements of the system memory to their corresponding destinations in the LDS.

In this way, the memory unit is configured to store data from an LDS as compacted data in the system memory and write compacted data in the system memory as uncompacted data in an LDS, helping to reduce the footprint of the data stored in the system memory. For example, the memory unit is enabled to only write certain results (e.g., non-zero results, results necessary for the execution of subsequent waves) to a data structure in the system memory which helps reduce the number of empty elements in the data structure of the system memory. That is to say, the memory unit is configured to store compacted data within the system memory by only writing certain results of the threads based on the compaction masks. Because the number of empty elements in the data structure is reduced (e.g., because the data is compacted), the memory footprint of the data structure is reduced, decreasing the system memory usage needed to execute the threads of the waves. Further, the memory unit is configured to determine the destinations within the system memory to store compacted data and destinations within an LDS to store decompacted data without needing the waves themselves to determine prefix values. Because the memory unit rather than the waves determines the prefix values to determine the destinations within the system memory and LDSs, less synchronization between the waves is required, helping to improve processing times and processing efficiency.

FIG. 1 is a block diagram of a processing system 100 configured for compacted memory transactions for local data shares (LDSs), according to some embodiments. The processing system 100 includes or has access to system memory 106 or other storage component implemented using a non-transitory computer-readable medium, for example, a dynamic random-access memory (DRAM). However, in embodiments, system memory 106 is implemented using other types of memory including, for example, static random-access memory (SRAM), nonvolatile RAM, and the like. According to embodiments, system memory 106 includes an external memory implemented external to the processing units implemented in the processing system 100. The processing system 100 also includes a bus 105 to support communication between entities implemented in the processing system 100, such as system memory 106. Some embodiments of the processing system 100 include other buses, bridges, switches, routers, and the like, which are not shown in FIG. 1 in the interest of clarity.

The techniques described herein are, in different implementations, employed at accelerator unit (AU) 112. AU 112 includes, for example, vector processors, coprocessors, graphics processing units (GPUs), general-purpose GPUs (GPGPUs), non-scalar processors, highly parallel processors, artificial intelligence (AI) processors, inference engines, machine-learning processors, other multithreaded processing units, scalar processors, serial processors, programmable logic devices (simple programmable logic devices, complex programmable logic devices, field programmable gate arrays (FPGAs)), or any combination thereof. AU 112 is configured to execute instructions and operations for one or more applications 108 executing on processing system 100. As an example, in some embodiments, AU 112 is configured to execute instructions and operations for an application 108 such that a set of frames each representing respective scenes within a screen space (e.g., the space in which a scene is displayed) are rendered for presentation on a display 124. For example, by executing one or more instructions, operations, or both for an application 108, AU 112 renders graphics objects (e.g., sets of primitives) for a scene to be displayed so as to produce pixel values representing a rendered frame. AU 112 then provides the rendered frame (e.g., pixel values) to display 124. These pixel values, for example, include color values (YUV color values, RGB color values), depth values (z-values), or both. After receiving the rendered frame, display 124 uses the pixel values of the rendered frame to display the scene including the rendered graphics objects. To render the graphics objects, AU 112 implements processor cores 114-1 to 114-N that execute instructions concurrently or in parallel. For example, AU 112 executes instructions, operations, or both from a graphics pipeline using processor cores 114 to render one or more graphics objects. A graphics pipeline includes, for example, one or more steps, stages, or instructions to be performed by AU 112 in order to render one or more graphics objects for a scene. Though in the example implementation illustrated in FIG. 1, three processor cores (114-1, 114-2, 114-N) are presented representing an N number of cores, the number of processor cores 114 implemented in AU 112 is a matter of design choice. As such, in other implementations, AU 112 can include any number of processor cores 114. In some embodiments, AU 112 is configured to perform instructions, operations, or both for general-purpose computing applications, machine-learning applications, neural network applications, or any combination thereof, to name a few.

In embodiments, AU 112 is configured to receive a set of instructions from an application 108 indicating one or more instructions, operations, or both to be performed. As an example, the set of instructions indicates groups of work items (e.g., threads) each identifying, for example, one or more operations to be performed. According to embodiments, the set of instructions identifies one or more waves to be executed by AU 112, with each wave including one or more threads (e.g., groups of work items) to be executed. To execute the threads within a wave, one or more processor cores 114 of AU 112 are configured to operate as one or more respective compute units configured to concurrently perform instructions and operations indicated in one or more waves. Each compute unit includes one or more single instruction, multiple data (SIMD) units each including a plurality of lanes configured, for example, to perform a same operation on different data sets as indicated in one or instructions received from an application 108. As an example, each SIMD unit includes a plurality of arithmetic logic units (ALUs) that each perform a same operation on a plurality of data sets. In embodiments, one or more SIMD units of a compute unit include a vector SIMD unit (e.g., a SIMD unit including one or more vector ALUs), a scalar SIMD unit (e.g., a SIMD unit including one or more scalar ALUs), or both. According to embodiments, each compute unit is configured to concurrently execute (e.g., launch) one or more waves. For example, one or more lanes of each SIMD unit of a compute unit are configured to concurrently perform the operations for one or more threads of the waves. Each portion (e.g., lanes) of a SIMD unit configured to perform operations for threads of a wave is also referred to herein, for example, as a waveslot. In this way, a compute unit has a number of waveslots (e.g., portions of SIMD units) each configured to concurrently execute threads for one or more waves.

To help each processor core 114 operating as one or more compute units execute instructions and operations for waves, each processor core 114 includes or is otherwise connected to a respective local data share (LDS) 116. An LDS 116, for example, includes a memory (e.g., SRAM) shared across each SIMD unit of one or more compute units. As an example, an LDS 116 includes a memory shared across each SIMD unit of one or more compute such that the LDS 116 is shared across each wave executing on the compute units (e.g., a processor core 114 operating as the one or more compute units). In embodiments, an LDS 116 includes a logical block of memory configured to be accessed by one or more compute units, a memory unit 118, or both. For example, according to some embodiments, an LDS 116 is a physical block of memory dedicated to one or more processor cores 114, one or more compute units, one or more memory units 118, or any combination thereof. In other embodiments, an LDS 116 is a block of memory otherwise accessible by one or more compute units, a memory unit 118, or both, for example, a block of memory next to a compute unit, at least a portion of a cache hierarchy (e.g., AU cache hierarchy), at least a portion of a system memory 106, at least a portion of a register file of a compute unit, or any combination thereof.

In embodiments, an LDS 116 is configured to store results (e.g., data resulting from the execution of one or more threads by one or more compute units (e.g., the SIMD units of the compute units). For example, in some embodiments, respective portions of an LDS 116 are assigned to each thread of the waves being concurrently executed by the compute units. As an example, according to embodiments, an LDS 116 is configured to store a data structure (e.g., matrix) having one or more elements. One or more respective elements of this data structure are each assigned to a corresponding thread of the waves being currently executed by the compute units connected to the LDS 116 such that data resulting from the executing of a respective thread is stored in the corresponding elements of the data structure assigned to the thread. Additionally, in some embodiments, an LDS 116 is configured to store operands, variables, constants, or any combination thereof necessary for, aiding in, or helpful for the performance of one or more operations by the compute units. For example, one or more respective elements of a data structure in an LDS 116 are each allocated to a respective thread of the waves to be concurrently executed such that the assigned elements of the data structure store operands, variables, constants, or any combination thereof necessary for, aiding in, or helpful for the performance of a corresponding thread. Though the example embodiment presented in FIG. 1 shows each processor core 114 includes one respective LDS (116-1, 116-2, 116-N), in other embodiments, each processor core 114 can include or otherwise be connected to any number of LDSs 116.

According to some embodiments, each processor core 114 includes or is otherwise connected to a respective memory unit 118-1, 118-2, 118-N configured to handle memory transactions between the LDS 116 of the processor core 114 and system memory 106. As an example, to help reduce the amount of system memory 106 needed to execute one or more waves on a processor core 114, a memory unit 118 of the processor core 114 is configured to perform compacted memory transactions between the LDS 116 of the processor core 114 and system memory 106. To this end, in embodiments, a processor core 114 operating as one or more compute units is configured to receive a set of instructions from an application 108 that indicate one or more waves (e.g., groups of threads) to be performed and a corresponding compaction mask 110 for each wave. A compaction mask 110, for example, includes a number of elements (e.g., bits) that each indicates whether compacted data is to be transferred between the system memory 106 and an LDS 116 for a respective thread of a corresponding wave. As an example, a compaction mask 110 includes a number of bits each corresponding to a thread of a certain wave. Each bit of the number of bits having a first value (e.g., 1) indicates that compacted data is to be transferred between the system memory 106 and an LDS 116 for a corresponding thread while each bit of the number of bits having a second value (e.g., 0), different from the first value, indicates that compacted data is not to be transferred between the system memory 106 and an LDS 116 for a corresponding thread. In response to a processor core 114 receiving a set of instructions indicating one or more compaction masks 110, the memory unit 118 of the processor core 114 stores the compaction masks 110 in the registers (not shown for clarity) of the memory unit 118.

Based on stored compaction masks 110, a memory unit 118 is configured to store data from an LDS 116 as compacted data in system memory 106 and store compacted data in the system memory 106 as decompacted data in the LDS 116. As an example, after performing one or more operations for a thread, a compute unit is configured to store the data resulting from the performance of the thread (e.g., results) in an element of a data structure in the LDS 116 assigned to the thread. Once one or more results are stored in the data structures in the LDS 116, the memory unit 118 is then configured to write the results to system memory 106 based on one or more compaction masks 110. To this end, the memory unit 118 is configured to retrieve a respective compaction mask 110 for each wave that includes threads having results stored in the LDS 116. That is to say, each wave that includes threads concurrently executed by the compute units to produce the results stored in the LDS 116. After retrieving these compaction masks 110 for the waves, the memory unit 118 then combines the compaction masks 110 to produce a combined compaction mask that includes a number of bits indicating whether each thread of the waves concurrently executed by the compute units is to have compacted data transferred between the system memory 106 and an LDS 116. Using the combined compaction mask, the memory unit 118 then writes data from the LDS 116 to system memory 106. For example, the memory unit 118 only writes data from portions of the LDS 116 allocated to threads that are to have compacted data transferred between the system memory 106 and an LDS 116 as indicated by the combined compaction mask. As an example, the memory unit 118, based on the combined compaction mask, first identifies each thread of the waves executed by the compute units that are to have compacted data transferred between the system memory 106 and an LDS 116. The memory unit 118 then writes data from portions of the LDS 116 (e.g., elements of a data structure in LDS 116) allocated to the identified threads to system memory 106.

To determine the destinations (e.g., memory address) within system memory 106 in which to write the data from the portions of the LDS 116, the memory unit 118 is configured to use the combined compaction mask. As an example, for each element (e.g., bit) in the combined compaction mask indicating a corresponding thread is to have compacted data transferred between the system memory 106 and an LDS 116, the memory unit 118 determines a prefix sum. Based on the prefix sum determined for an element of the combined compaction mask, the memory unit 118 then identifies a destination (e.g., memory address) within system memory 106 in which to store data from the portion of the LDS 116 assigned to the thread corresponding to that element of the combined compaction mask. Based on the determined destinations, the memory unit 118 then stores the data from the portions of the LDS 116 assigned to the identified threads of the waves to the determined destinations in system memory 106 as compacted data 120. Such compacted data 120, for example, includes data stored in a data structure with no empty elements. In this way, the memory unit 118 is configured to only store certain results stored in the LDS 116 to system memory 106 as compacted data, helping to reduce the number of empty elements in system memory 106. For example, in some embodiments, based on the compaction masks 110, the memory unit 118 is configured to only write non-zero results and results used to execute subsequent waves in system memory 106, helping reduce the number of empty elements. Because the number of empty elements in system memory 106 is reduced, the system memory usage needed to execute the threads of the waves is reduced, helping to improve processing efficiency. Additionally, because the prefix sums and destinations are determined by the memory unit 118 rather than the waves themselves, the processing time and processing resources needed to execute the threads of the waves are also reduced.

Further, each memory unit 118 is also configured to write compacted data 120 from system memory 106 as decompacted data (e.g., data in a data structure having one or more empty elements) in a respective LDS 116. For example, a memory unit 118 is configured to write variables, results, constants, operands, or any combination thereof stored as compacted data 120 in system memory 106 to an LDS 116 so as to make the variables, results, constants, operands, or any combination available during the execution of the threads of one or more waves. To this end, the memory unit 118 is configured to retrieve respective compaction masks 110 for one or more waves to be concurrently executed by associated compute units. After retrieving these compaction masks 110, the memory unit 118 then combines the compaction masks 110 to produce a combined compaction mask that includes a number of elements (e.g., bits) each indicating whether a corresponding thread of the waves to be executed is to have compacted data transferred between the system memory 106 and an LDS 116. Based on the combined compaction mask, the memory unit 118 identifies a number of elements of a data structure in system memory 106 storing compacted data 120 to be written to an LDS 116. As an example, the memory unit 118 determines the number of elements in the combined compaction mask that each indicates a corresponding thread is to have compacted data transferred between the system memory 106 and an LDS 116. The memory unit 118 then identifies a number of elements of a data structure storing compacted data 120 in system memory 106 equal to the number of elements in the combined compaction mask that each indicates a corresponding thread is to have compacted data transferred between the system memory 106 and an LDS 116.

To determine a source in the system memory 106 for each element in LDS 116 (e.g., corresponding to a thread in a wave) indicated to have received compacted data, the memory unit 118 is configured to use the combined compaction mask. For example, for each element (e.g., bit) in the combined compaction mask indicating a corresponding thread is to have compacted data transferred between the system memory 106 and an LDS 116, the memory unit 118 determines a prefix sum. Based on the prefix sums determined for the elements of the combined compaction mask, the memory unit 118 then identifies respective sources (e.g., memory address) within system memory 106 from which to load data (e.g., compacted data 120). The memory unit 118 then writes the compacted data 120 in the identified number of elements of the data structure in system memory 106 to the determined destinations of the LDS 116. As an example, the memory unit 118 first determines a prefix sum for the Nth element of the combined compaction mask that indicates a corresponding thread is to have compacted data transferred between the system memory 106 and an LDS 116. Based on this determined prefix sum, the memory unit 118 then identifies a source (e.g., memory address) within the system memory 106 and writes the compacted data from the Nth element of the data structure at the source in system memory 106 to the element within the LDS 116 corresponding to the thread. In this way, the memory unit 118 is configured to determine the sources within the system memory 106 from which to load compacted data into an LDS 116 without needing the waves themselves to determine the prefix sums. Because the memory unit 118, rather than the waves, determines the prefix sums to determine the source within the system memory 106, less synchronization between the waves is required, helping to improve processing times and processing efficiency.

According to embodiments, a memory unit 118 is configured to write data from system memory 106 to an LDS 116 or from an LDS 116 to system memory 106 by performing one or more memory transactions. To help reduce the number of memory transactions to be performed, the memory unit 118 is configured to combine one or more memory transactions based on the determined locations within system memory 106 or an LDS 116. For example, based on the memory unit 118 determining that compacted data 120 is to be written to consecutive destinations (e.g., consecutive memory addresses) in an LDS 116 from system memory 106, the memory unit 118 performs a single memory transaction by, for example, combining a first memory transaction to transfer compacted data 120 to a first destination of the consecutive destinations and a second memory transaction to transfer compacted data 120 to a second destination of the consecutive destinations. Likewise, as an example, based on the memory unit 118 determining that data is to be written to consecutive destinations (e.g., consecutive memory addresses) in system memory 106 from an LDS 116, the memory unit 118 performs a single memory transaction by, for example, combining a first memory transaction to transfer data to a first destination of the consecutive destinations and a second memory transaction to transfer data to a second destination of the consecutive destinations.

Further, in embodiments, the memory unit 118 is configured to flush one or more memory transaction queues, caches, or both based on writing compacted data 120 from system memory 106 to an LDS 116 or from an LDS 116 to system memory 106. For example, in some embodiments, the memory unit 118 generates one or more memory transactions to write compacted 120 data from system memory 106 to an LDS 116, from an LDS 116 to system memory 106, or both, and then stores these memory transactions in one or more memory transaction queues. The memory unit 118 then performs the memory transactions in these one or more memory transaction queues so as to write compacted data 120 from system memory 106 to an LDS 116, from an LDS 116 to system memory 106, or both. According to some embodiments, the memory unit 118 is configured to flush one or more of the memory transaction queues storing such memory transactions when writing compacted data 120 from system memory 106 to an LDS 116 or from an LDS 116 to system memory 106. For example, once the memory unit 118 begins writing compacted data 120 from system memory 106 to an LDS 116, from an LDS 116 to system memory 106, or both (e.g. once the memory unit 118 begins to perform one or more memory transactions for the compacted data 120), the memory unit 118 is configured to flush one or more of the memory transaction queues storing such memory transactions. Additionally, in some embodiments, the memory unit 118 is configured to flush one or more caches based on writing compacted data 120 from system memory 106 to an LDS 116, from an LDS 116 to system memory 106, or both. For example, based on writing compacted data 120 from an LDS 116 to system memory 106, the memory unit 118 is configured to flush one or more caches (e.g., AU 112 caches) that store a compacted representation of the compacted data 120 to be written at the destination address (e.g., memory address) of the compacted data 120 to be written.

In some embodiments, processing system 100 includes input/output (I/O) engine 122 that includes circuitry to handle input or output operations associated with display 124, as well as other elements of the processing system 100 such as keyboards, mice, printers, external disks, and the like. The I/O engine 122 is coupled to the bus 105 so that the I/O engine 122 communicates with system memory 106, AU 112, or the central processing unit (CPU) 102.

According to embodiments, processing system 100 also includes CPU 102 that is connected to the bus 105 and therefore communicates with AU 112 and system memory 106 via the bus 105. CPU 102 implements a plurality of processor cores 104-1 to 104-M that execute instructions concurrently or in parallel. In implementations, one or more of the processor cores 104 operate as SIMD units that perform the same operation on different data sets. Though in the example implementation illustrated in FIG. 1, three processor cores (104-1, 104-2, 104-M) are presented representing an M number of cores, the number of processor cores 104 implemented in CPU 102 is a matter of design choice. As such, in other implementations, CPU 102 can include any number of processor cores 104. In some implementations, CPU 102 and AU 112 have an equal number of processor cores 104, 114 while in other implementations, CPU 102 and AU 112 have a different number of processor cores 104, 114. The processor cores 104 of CPU 102 are configured to execute instructions such as program code for one or more applications 108 (e.g., graphics applications, compute applications, machine-learning applications) stored in system memory 106, and CPU 102 stores information in system memory 106 such as the results of the executed instructions. CPU 102 is also able to initiate graphics processing by issuing draw calls to AU 112.

Figure 2:
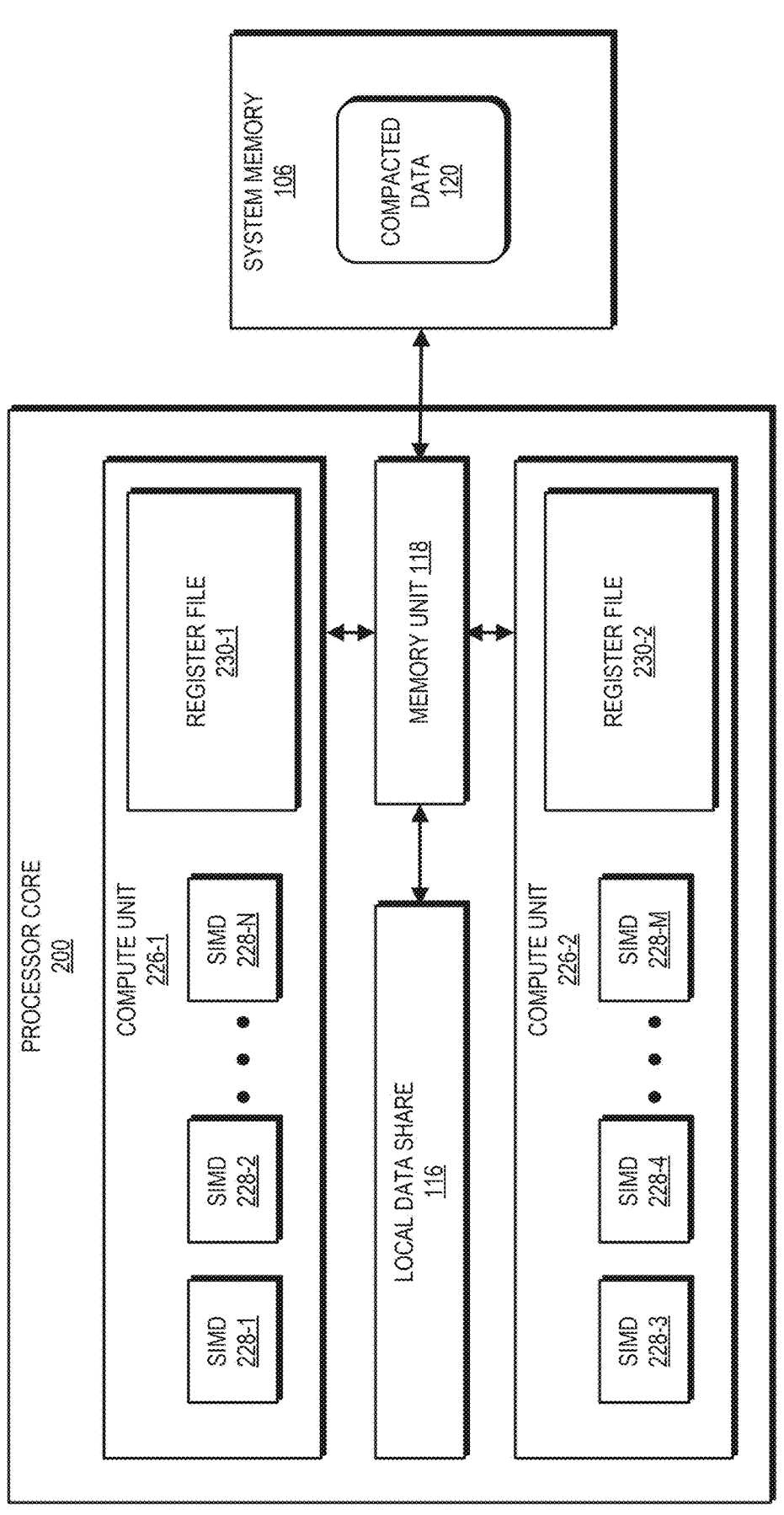
FIG. 2 is a block diagram illustrating an example processor core configured for compacted memory transactions for LDSs, in accordance with some embodiments.

Referring now to FIG. 2, an example processor core 200 operating as one or more compute units is presented, in accordance with some embodiments. In embodiments, example processor core 200 is implemented in processing system 100 as a processor core 114 of AU 112. According to embodiments, example processor core 200 is configured to operate as a first compute unit 226-1 and a second compute unit 226-1. The first compute unit 226-1, for example, is configured to execute one or more threads of one or more waves concurrently with the second compute unit 226-2 executing one or more other threads of one or more waves. Though the example embodiment presented in FIG. 2 shows example processor core 200 operating as two compute units 226-1, 226-2, in other embodiments, example processor core 200 can operate as any number of compute units 226. To execute threads for one or more waves, each compute unit 226 includes one or more SIMD units 228 each configured to perform operations for one or more threads of one or more waves. Though the example embodiment of FIG. 2 presents a first compute unit 226-1 having three SIMD units (228-1, 228-2, 228-N) representing an N number of SIMD units and a second compute unit 226-2 having three SIMD units (228-3, 228-4, 228-M) representing an M number of SIMD units, in other embodiments, each compute unit 226 may include any number of SIMD units 228.

To help the SIMD units 228 of the compute units 226 perform operations for one or more threads, each compute unit 226 includes one or more register files 230. For example, the first compute unit 226-1 includes a register file 230-1 and the second compute unit 226-2 includes a second register file 230-2. A register file 230, for example, includes one or more registers of the processor core 200 that store data used in the execution of one or more threads by the SIMD units 228 of a compute unit 226. For example, a register file 230 includes one or more instructions, variables, constants, operations, or any combination thereof necessary for, helpful in, or aiding in the execution of one or more threads. Additionally, to help the SIMD units 228 of the compute units 226 perform operations for one or more threads, example processor core 200 includes an LDS 116 connected to each SIMD unit 228 of example processor core 200. The LDS 116 is configured to also store one or more instructions, variables, constants, operations, or any combination thereof necessary for, helpful in, or aiding in the execution of one or more threads. For example, the LDS 116 is configured to store instructions, variables, constants, operations, or any combination thereof that overflow from a register file 230. Additionally, because the LDS 116 is connected to each SIMD unit 228 of the example processor core 200, the LDS 116 allows two or more threads being executed by the SIMD units 228 to communicate with each other (e.g., allows the SIMD units 228 executing the threads to communicate with each other).

Further, in embodiments, in response to a SIMD unit 228 executing one or more operations for a thread, the SIMD unit 228 is configured to store the result (e.g., data resulting from the execution of the operations) in the LDS 116. For example, in some embodiments, the LDS 116 includes a data structure having one or more elements each assigned to a thread of a wave being executed by the compute units 226-1, 226-2. As an example, the data structure includes one or more elements each assigned to a corresponding SIMD unit 228 (e.g., a SIMD unit 228 executing one or more threads of a wave). In embodiments, example processor core 200 includes a memory unit 118 configured to perform compacted memory transactions between the LDS 116 and system memory 106. For example, the memory unit 118 is configured to write one or more results from the SIMD units 228 stored in the LDS 116 to system memory 106 as compacted data 120. To this end, the memory unit 118 first retrieves a respective compaction mask 110 for each wave being concurrently executed by the compute units 226-1, 226-2 and then combines the retrieved compaction masks 110 to form a combined compaction mask. Based on the combined compaction mask, the memory unit 118 determines which data in the elements of the data structure in the LDS 116 to write to system memory 106. As an example, based on the combined compaction mask, the memory unit 118 identifies one or more threads of the waves being executed that are to have compacted data transferred between the LDS 116 and system memory 106. Further, based on the combined compaction mask, the memory unit 118 determines one or more destinations within system memory 106 to write data by, for example, determining a prefix sum for each set element of the combined compaction mask (e.g., each element of the compaction mask indicating a corresponding thread is to have compacted memory transferred between the LDS 116 and system memory 106). The memory unit 118 then writes data from the elements of the data structure in the LDS 116 assigned to the threads identified based on the combined compaction mask to system memory 106 at the determined locations to produce compacted data 120.

Further, in embodiments, the memory unit 118 is configured to write compacted data 120 from system memory 106 as decompacted data (e.g., data stored in a data structure having one or more empty elements) in the LDS 116. For example, the memory unit 118 is configured to write compacted data 120 indicating one or more results, variables, constants, operands, or any combination thereof used in the execution of one or more threads to the LDS 116. To this end, the memory unit 118 first retrieves a respective compaction mask 110 for each wave to be concurrently executed by the compute units 226-1, 226-2 and then combines the retrieved compaction masks 110 to form a combined compaction mask. Based on the combined compaction mask, the memory unit 118 determines a number of elements of the data structure in system memory 106 storing compacted data 120 to write to the LDS 116. For example, the memory unit 118 identifies a number of elements of the data structure in system memory 106 equal to the number of threads that are to have compacted data transferred between the LDS 116 and system memory 106 as indicated by the combined compaction mask. Additionally, based on the combined compaction mask (e.g., based on two or more compaction masks 110), the memory unit 118 determines one or more sources within the system memory 106 from which to load elements of the compacted data 120 into LDS 116 by, for example, determining a prefix sum for each set element of the combined compaction mask (e.g., each element of the compaction mask indicating a corresponding thread is to have compacted memory transferred between the LDS 116 and system memory 106). The memory unit 118 then writes data from each of the determined number of elements of the data structure in system memory 106 to a corresponding determined destination in the LDS 116.

Figure 3:
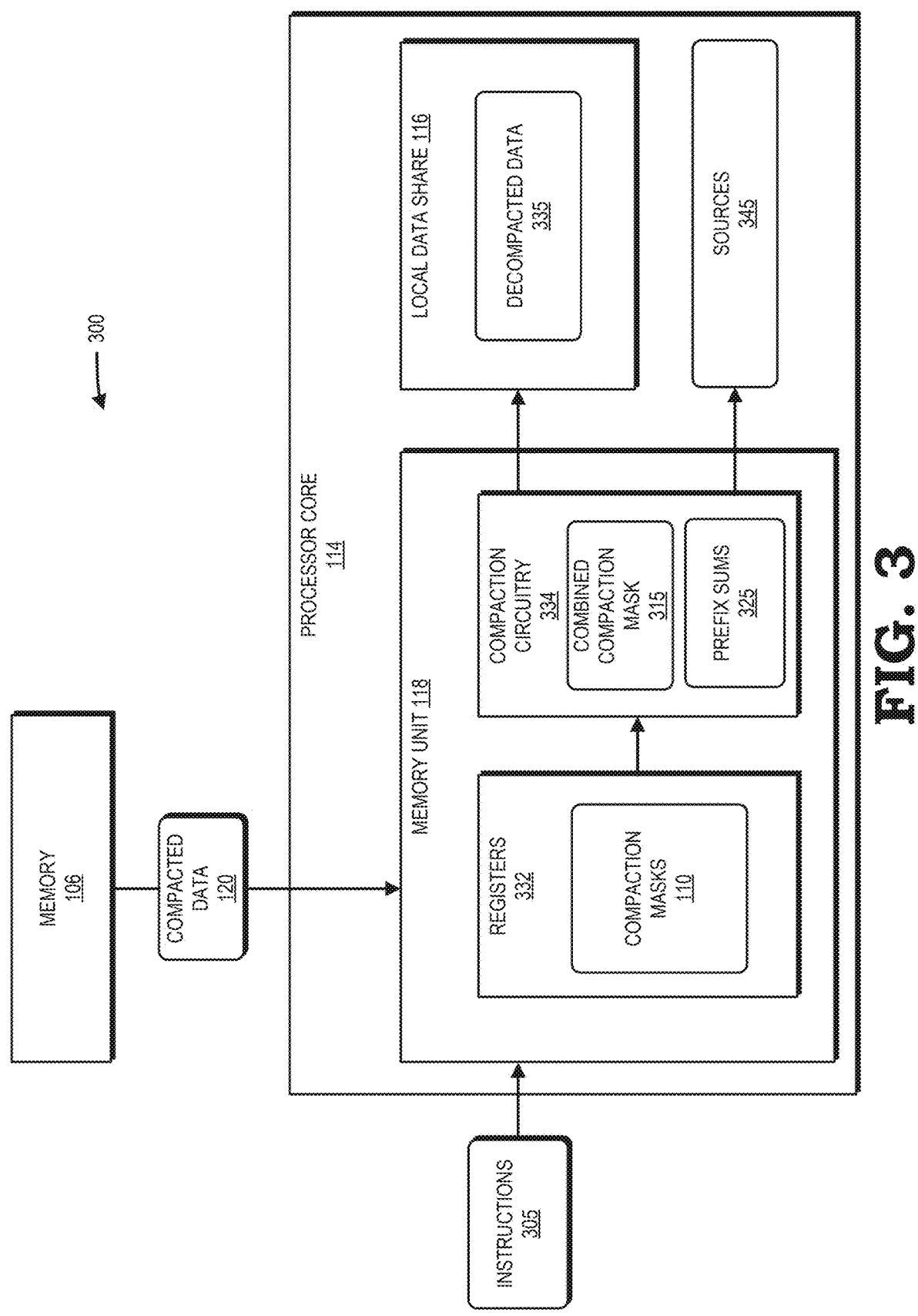
FIG. 3 is a flow diagram illustrating an example operation for writing compacted data from system memory to an LDS, in accordance with some embodiments.

Referring now to FIG. 3, an example operation 300 for writing compacted data from system memory to an LDS is presented, in accordance with embodiments. According to embodiments, example operation 300 is implemented by one or more processor cores 114 of AU 112 (e.g., one or more processor cores 114 operating as compute units 226). In embodiments, example operation 300 first includes a processor core 114 operating as one or more compute units receiving a set of instructions 305. The set of instructions 305, for example, includes data indicating one or more waves to be concurrently executed by the compute units of the processor core 114 with each wave having one or more threads to be executed. Additionally, the set of instructions 305 includes data indicating a respective compaction mask 110 for each wave to be concurrently performed. Based on receiving the set of instructions 305, the processor core 114 then stores data representing each compaction mask 110 indicated in the set of instruction 305 in one or more registers 332 of memory unit 118.

Additionally, example operation 300 includes a memory unit 118 writing compacted data 120 stored in system memory 106 to an LDS 116 as decompacted data 335. To this end, example operation 300 includes a compaction circuitry 334 of the memory unit 118 retrieving the compaction masks 110 for each wave to be concurrently executed from registers 332. After retrieving the compaction masks 110, the memory unit 118 then combines the retrieved compaction masks 110 to form a combined compaction mask 315. The combined compaction mask 315, for example, includes an element for each thread of the waves to be concurrently executed with each element including data (e.g., a bit) indicating whether a corresponding thread is to have compacted data transferred between system memory 106 and an LDS 116. As an example, the combined compaction mask 315 includes a bit for each thread of the waves to be concurrently performed with each bit having a first value (e.g., 1) indicating that a corresponding thread is to have compacted data transferred between system memory 106 and an LDS 116 and each bit having a second value (e.g., 0) indicating that a corresponding thread is not to have compacted data transferred between system memory 106 and an LDS 116.

Based on combined compaction mask 315, compaction circuitry 334 then determines a number of elements of a data structure in system memory 106 that include compacted data 120 to be written to the LDS 116. As an example, compaction circuitry 334 determines a number of elements of a data structure in system memory 106 equal to the number of elements in the combined compaction mask 315 that each indicates a corresponding thread is to have compacted data transferred between system memory 106 and an LDS 116. Compaction circuitry 334 then determines a respective source 345 within the system memory 106 from which compacted data 120 is to be loaded to each element in LDS 116 which is indicated to have received compacted data (e.g., by having a respective bit set in combined compaction mask 315). A source 345, for example, represents a memory address within the system memory 106. As an example, to determine a respective source 345 from which to load elements of the compacted data 120 to an element of LDS 116, compaction circuitry 334 first determines a prefix sum 325 for the Nth element of the combined compaction mask 315 that indicates a corresponding thread is to have data transferred between system memory 106 and an LDS 116. Based on the determined a prefix sum 325, compaction circuitry 334 then determines a source 345 in the system memory 106 by, for example, adding the determined a prefix sum 325 to an initial memory address of the system memory 106. In some embodiments, compaction circuitry 334 is configured to determine a source 345 further based on a predetermined stride value indicated in the set of instructions 305. As an example, compaction circuitry 334 is configured to multiply the prefix sum 325 by a predetermined stride value before adding the prefix sum 325 (e.g., as multiplied by the predetermined stride value) to an initial memory address of the system memory 106. According to some embodiments, determining a source 345 within the system memory 106 from which to load compacted data 120 to an element of LDS 116 corresponding to the Nth entry of the combined compaction mask 315 is expressed as:

$$\text{scr}_{addr} + \text{PrefixSum(combined compaction mask}[0:N])*\text{scr\_stride} \quad \text{[EQ1]}$$

Wherein $\text{scr}_{addr}$ represents an initial memory address of the system memory 106, PrefixSum represents a function to determine a prefix sum 325, combined compaction mask represents the combined compaction mask 315, and scr\_stride represents a predetermined stride value indicated in the set of instructions 305.

After determining the sources 345 from which to load the compacted data 120 from each of the number of determined elements of the data structure in system memory 106, memory unit 118 is configured to load the compacted data 120 from the sources 345 to corresponding elements in the LDS 116 to produce decompacted data 335 (e.g., data stored in a data structure having one or more empty elements). By storing compacted data 120 in LDS 116 as decompacted data 335, the data structure in LDS 116 storing the data from system memory 106 is enabled to have a respective element assigned to each thread of the waves to be performed concurrently. In some embodiments, to load compacted data 120 to the LDS 116, the memory unit 118 is configured to combine two or more memory transactions based on the determined sources 345. As an example, based on two or more of the determined sources 345 being consecutive memory addresses in the system memory 106, the memory unit 118 combines each memory transaction configured to write to one of the consecutive memory addresses into a single memory transaction. By combining the memory transactions based on determined sources 345 being consecutive memory addresses in the system memory 106, the memory unit 118 reduces the number of memory transactions needed to write the compacted data 120 to the LDS 116, helping to reduce the time and resources needed to write the compacted data 120.

Additionally, in embodiments, the memory unit 118 is configured to flush one or more memory transaction queues when writing compacted data 120 from system memory 106 to the LDS 116. As an example, in some embodiments, the memory unit 118 generates one or more memory transactions to write compacted 120 data from one or more sources 345 in system memory 106 to the LDS 116 and stores these memory transactions in one or more memory transaction queues. The memory unit 118 then flushes these memory transaction queues storing such memory transactions based on writing compacted data 120 from system memory 106 to the LDS 116. For example, once the memory unit 118 begins writing compacted data 120 from system memory 106 to the LDS 116, the memory unit 118 is configured to flush one or more of the memory transaction queues storing such memory transactions.

Figure 4:
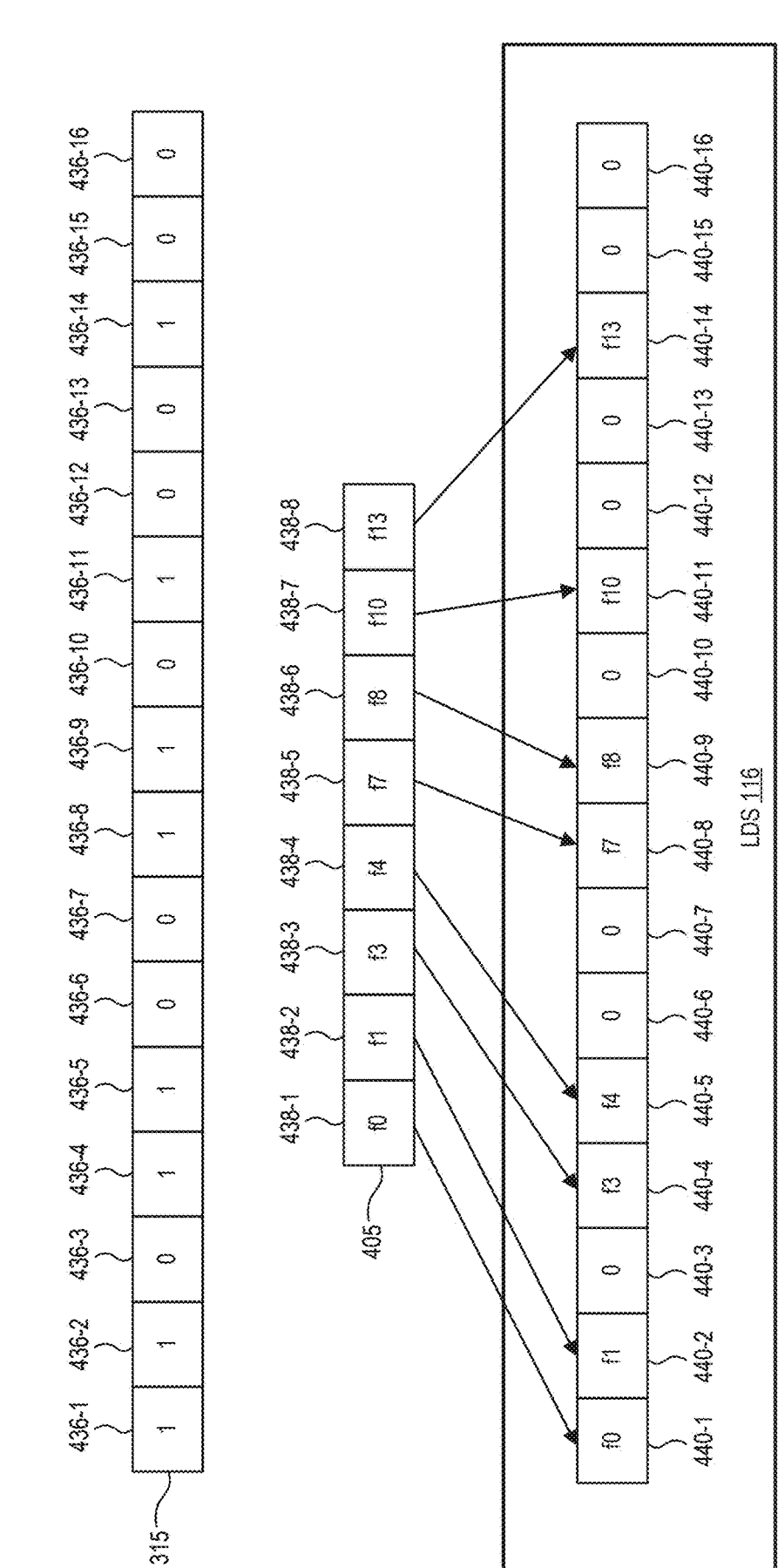
FIG. 4 is a flow diagram illustrating an example operation for decompacting data using a compaction mask, in accordance with some embodiments.

Referring now to FIG. 4, an example operation 400 for decompacting data using a compaction mask is presented, in accordance with embodiments. According to some embodiments, example operation 400 is implemented by a processor core 114 of AU 112 operation as one or more compute units (e.g., compute units 226). In embodiments, example operation 400 first includes a memory unit 118 determining a number of elements 438 of a data structure 405 stored in system memory 106 from which to write data to an LDS 116. To this end, the memory unit 118 first identifies a number of elements 436 in a combined compaction mask 315 associated with two or more waves to be concurrently performed. As an example, the memory unit 118 identifies the number of elements 436 in the combined compaction mask 315 that each indicates a corresponding thread is to heave compacted data transferred between system memory 106 and an LDS 116. Referring to the example embodiment presented in FIG. 4, a combined compaction mask includes 16 elements (436-1, 436-2, 436-3, 436-4, 436-5, 436-6, 436-7, 436-8, 436-9, 436-10, 436-11, 436-12, 436-13, 436-14, 436-14, 436-15, 436-16) each corresponding to a respective thread of two or more waves to be performed concurrently. As an example, elements 436-1 to 436-8 of the combined compaction mask 315 each correspond to a respective thread in a first wave, and elements 436-9 to 436-16 each correspond to a respective thread in a second wave. Within the combined compaction mask 315 of the example embodiment in FIG. 4, elements 436-1, 436-2, 436-4, 436-5, 436-8, 436-9, 436-11, and 436-14 each include data (e.g., a bit) having a first value (e.g., 1) indicating that a corresponding thread is to have compacted data transferred between system memory 106 and an LDS 116. Further, elements 436-3, 436-6, 436-7, 436-10, 436-12, 436-13, 436-15, and 436-16 each include data (e.g., a bit) having a second value (e.g., 0), different from the first value, indicating a corresponding thread is not to have compacted data transferred between system memory 106 and an LDS 116. Though the example embodiment in FIG. 4 presents combined compaction mask 315 as including 16 elements (436-1, 436-2, 436-3, 436-4, 436-5, 436-6, 436-7, 436-8, 436-9, 436-10, 436-11, 436-12, 436-13, 436-14, 436-14, 436-15, 436-16) each corresponding to a thread of two or more waves to be performed concurrently, in other embodiments, combined compaction mask 315 can include any number of elements 436 each corresponding to a respective thread of two or more waves to be performed concurrently.

Based on the combined compaction mask 315 presented in the example embodiment of FIG. 4, the memory unit 118 determines that eight elements (436-1, 436-2, 436-4, 436-5, 436-8, 436-9, 436-11, and 436-14) of the combined compaction mask 315 indicate a corresponding thread is to have compacted data transferred between system memory 106 and an LDS 116. Because the memory unit 118 determines that eight elements of the combined compaction mask 315 indicate a corresponding thread is to have compacted data transferred between system memory 106 and an LDS 116, the memory unit 118 then identifies eight elements (438-1, 438-2, 438-3, 438-4, 438-5, 438-6, 438-7, 438-8) of a data structure 405 in system memory 106 from which to write data (e.g., compacted data 120) to the elements 440 of LDS 116 corresponding to the threads of the waves. To this end, the memory unit 118 determines a respective source 345 within the system memory 106 from which to write data to a corresponding element 440 of the LDS 116 associated with the Nth element 436 of the combined compaction mask 315. To determine a respective source 345 within the system memory 106 from which to write data to a corresponding element 440 of the LDS 116 associated with the Nth element 436 of the combined compaction mask 315, the memory unit 118 determines a prefix sum 325 for the Nth element 436 in the combined compaction mask 315 indicating a corresponding thread is to have compacted data transferred between system memory 106 and the LDS 116.

As an example, referring to the example embodiment presented in FIG. 4, the memory unit 118 determines a prefix sum 325 for element 436-1 of the combined compaction mask 315 to determine a source 345 from which to load data to element 440-1 of the LDS 116, a prefix sum 325 for element 436-2 to determine a source 345 from which to load data to element 440-2, a prefix sum 325 for element 436-4 to determine a source 345 from which to load data to element 440-4, a prefix sum 325 for element 436-5 to determine a source 345 from which to load data to element 440-5, a prefix sum 325 for element 436-8 to determine a source 345 from which to load data to element 440-8, a prefix sum 325 for element 436-9 to determine a source 345 from which to load data to element 440-9, a prefix sum 325 for element 436-11 to determine a source 345 from which to load data to element 440-11, and a prefix sum 325 for element 436-14 to determine a source 345 from which to load data to element 440-14. To determine a source 345 from a prefix sum 325, for example, the memory unit 118 adds the prefix sum 325 to an initial memory address of a data structure 405 in the system memory 106.

Referring to the example embodiment presented in FIG. 4, based on the determined prefix sums 325 for the elements 436 of the combined compaction mask 315, example operation 400 includes the memory unit 118 determining a source 345 of element 438-1 of the data structure 405 in system memory 106 from which to write data (e.g., compacted data 120) to element 440-1 of LDS 116, a source 345 of element 438-2 from which to write data to element 440-2, a source 345 of element 438-3 from which to write data to element 440-4, a source 345 of element 438-4 from which to write data to element 440-5, a source 345 of element 438-5 from which to write data to element 440-8, a source 345 of element 438-6 from which to write data to element 438-9, a source 345 of element 438-7 from which to write data to element 440-11, and a source 345 of element 438-8 from which to write data to element 440-14. In this way, the memory unit 118 is configured to write compacted data 120 from system memory 106 as decompacted data 335 (e.g., data stored with one or more empty elements) in the elements 440 of the LDS 116. For example, elements 440-1, 440-2, 440-4, 440-5, 440-8, 440-9, 440-11, 440-14 are configured to store data from system memory 106 while elements 440-3, 440-6, 440-7, 440-10, 440-12, 440-13, 440-15, and 440-16 are empty. By writing the data from the system memory 106 as decompacted data 335 in LDS 116, the data structure is enabled to have a number of elements 440 equal to the number of threads of the waves to be executed concurrently as required by certain instructions and operations.

Figure 5:
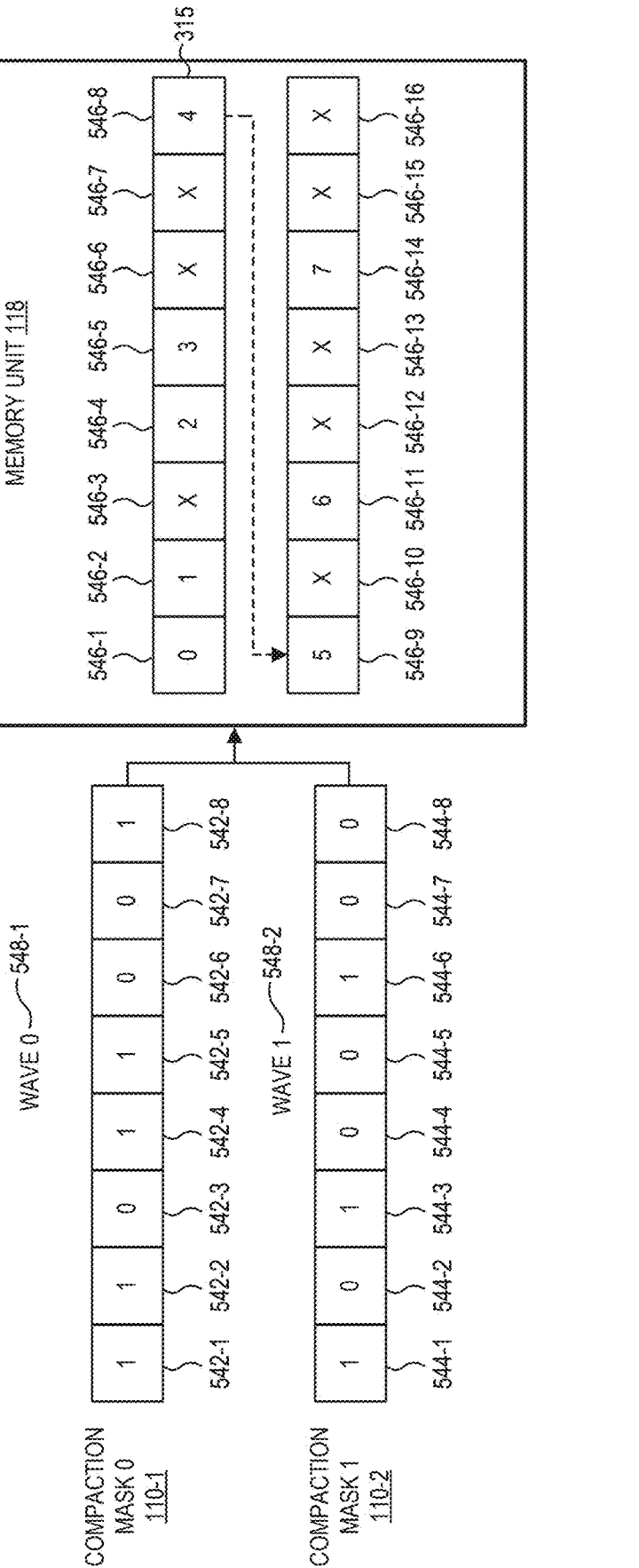
FIG. 5 is a flow diagram illustrating an example operation for determining prefix sums based on compaction masks, in accordance with some embodiments.

Referring now to FIG. 5, an example operation 500 for determining prefix sums based on compaction masks is presented, in accordance with embodiments. According to embodiments, example operation 500 is implemented in processing system 100 by a memory unit 118 of AU 112. In example operation 500, one or more compute units (e.g., compute units 226) are configured to concurrently execute a first wave (e.g., wave 0 548-1) and a second wave (e.g., wave 1 548-2) each having eight threads to be executed. Though the example embodiment of FIG. 5 presents each wave 548 as including eight threads, in other embodiments, each wave 548 can include any number of threads.

According to embodiments, example operation 500 includes the memory unit 118 retrieving a first compaction mask 0 110-1 associated with the first wave 0 548-1 and a second compaction mask 1 110-2 associated with the second wave 1 548-1. As an example, the memory unit 118 retrieves the first compaction mask 0 110-1 and the second compaction mask 1 110-2 from one or more registers 332 of the memory unit 118. The first compaction mask 0 110-1 includes a number of elements (e.g., 542-1, 542-2, 542-3, 542-4, 542-5, 542-6, 542-7, 542-8) corresponding to the number of threads in wave 0 548-1 with each element 542 including data (e.g., a bit) indicating whether a corresponding thread of wave 0 548-1 is to have compacted data transferred between system memory 106 and an LDS 116. As an example, elements 542-1, 542-2, 542-4, 542-4, and 542-8 include data having a first value (e.g., 1) indicating a corresponding thread is to have compact data transferred between the system memory 106 and an LDS 116 and elements 542-3, 542-6, and 542-7 include data having a second value (e.g., 0), different from the first value, indicating a corresponding thread is to not have compact data transferred between the system memory 106 and an LDS 116. Further, the second compaction mask 1 110-2 includes a number of elements (e.g., 544-1, 544-2, 544-3, 544-4, 544-5, 544-6, 544-7, 544-8) corresponding to the number of threads in wave 1 548-2 with each element 544 including data (e.g., a bit) indicating whether a corresponding thread of wave 1 548-2 is to have compacted data transferred between system memory 106 and an LDS 116. As an example, elements 544-1, 544-3, and 544-6 include data having a first value (e.g., 1) indicating a corresponding thread is to have compact data transferred between the system memory 106 and an LDS 116 and elements 544-2, 544-4, 544-5, 544-7, and 544-8 include data having a second value (e.g., 0), different from the first value, indicating a corresponding thread is to not have compact data transferred between the system memory 106 and an LDS 116. A person of skill in the art will appreciate that, in other embodiments, the number of elements 542 in the first compaction mask 0 110-1 and the number of elements in the second compaction mask 1 110-2 will vary based on the number of threads in wave 0 548-1 and wave 1 548-2, respectively.

In embodiments, example operation 500 includes memory unit 118 combining the first compaction mask 0 110-1 with the second compaction mask 1 110-2 to form a combined compaction mask 315. As an example, the memory unit 118 combines the first compaction mask 0 110-1 with the second compaction mask 1 110-2 such that the combined compaction mask 315 has a first number of elements representing the data in the elements the first compaction mask 0 110-1 and a second number of elements representing the data in the elements of the second compaction mask 1 110-2. Referring to the example embodiment presented in FIG. 5, combined compaction mask 315 includes elements 546-1, 546-2, 546-3, 546-4, 546-5, 546-6, 546-7, and 546-8 each representing the data in respective elements 542-1, 542-2, 542-3, 542-4, 542-5, 542-6, 542-7, and 542-8 of the first compaction mask 0 110-1. Additionally, combined compaction mask 315 includes elements 546-9, 546-10, 546-11, 546-12, 546-13, 546-14, 546-15, and 546-16 each representing the data in respective elements 544-1, 544-2, 544-3, 544-4, 544-5, 544-6, 544-7, and 544-8 of the second compaction mask 1 110-2.

According to embodiments, example operation 500 includes memory unit 118 determining prefix sums 325 for each element of the combined compaction mask 315 that include data (e.g., a first value) indicating a corresponding thread is to have compacted data transferred between system memory 106 and an LDS 116. As an example, example operation 500 includes memory unit 118 determining prefix sums 325 so as to determine one or more sources 345 in the system memory 106 from which to load compacted data 120 to an LDS 116, one or more destinations (e.g., destinations 645 in FIG. 6) in system memory 106 to store data from an LDS 116, or both. Referring to the example embodiment presented in FIG. 5, the memory unit 118 is configured to determine a first prefix sum 325 for element 546-1 of combined compaction mask 315, a second prefix sum 325 for element 546-2, a third prefix sum 325 for element 546-4, a fourth prefix sum 325 for element 546-5, a fifth prefix sum 325 for element 546-8, a sixth prefix sum 325 for element 546-9, a seventh prefix sum 325 for element 546-11, and an eighth prefix sum 325 for element 546-14. In this way, example operation 500 includes memory unit 118 determining prefix sums 325 without needing any synchronization between wave 0 548-1 and wave 1 548-2. Because memory unit 118 is configured to determine the prefix sums 325 without synchronization between wave 0 548-1 and wave 1 548-2, the processing time and processing resources needed to calculate such prefix sums 325 is reduced, helping improve the processing efficiency for compacted memory transactions.

Figure 6:
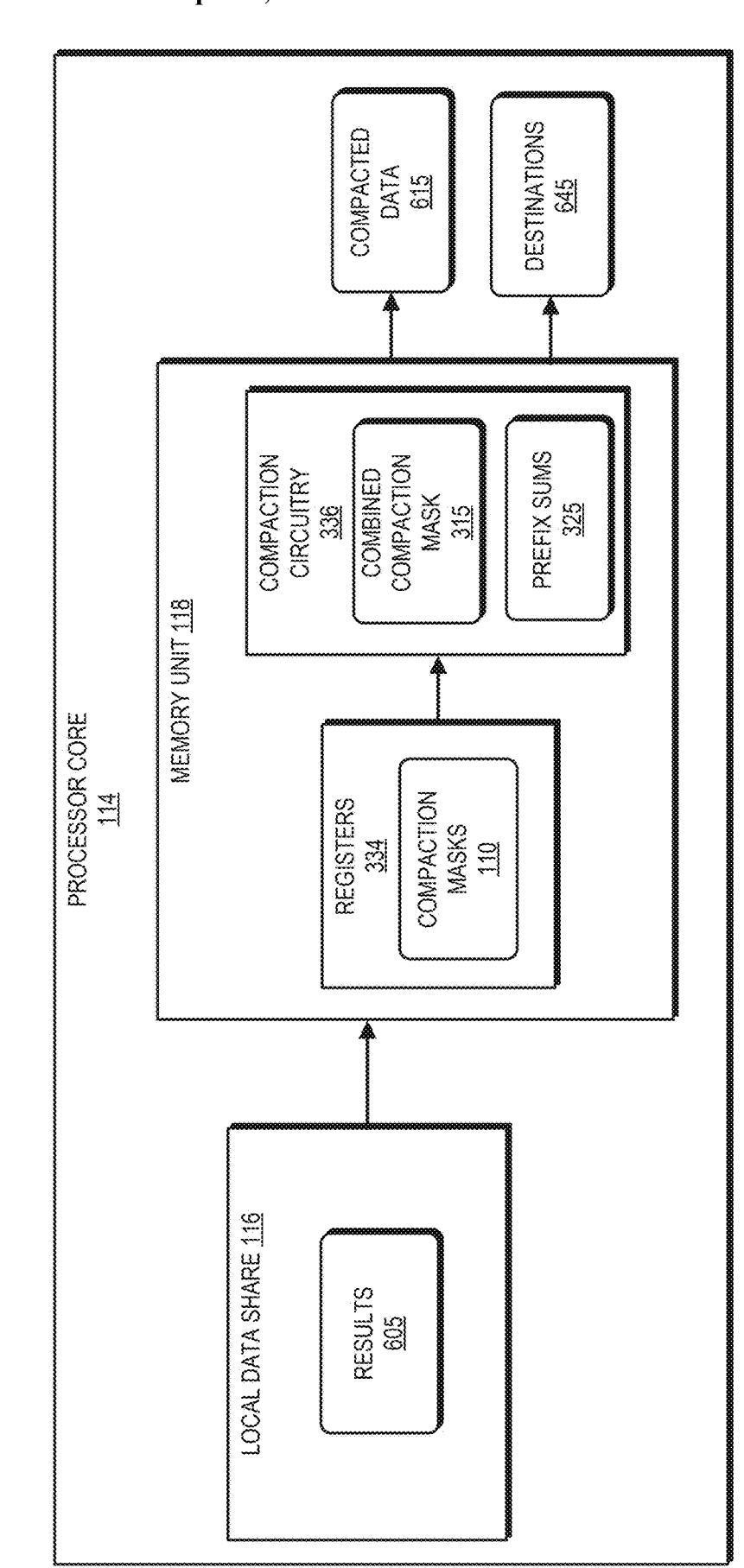
FIG. 6 is a flow diagram illustrating an example operation for writing data to the system memory from an LDS as compacted data, in accordance with some embodiments.

Referring now to FIG. 6, an example operation 600 for writing data to the system memory from an LDS as compacted data. According to embodiments, example operation 600 is implemented by a memory unit 118 of AU 112. In embodiments example operation 600 includes a memory unit 118 writing results 605 stored in an LDS 116 to system memory 106 as compacted data (e.g., compacted data 120). Results 605, for example, include data resulting from the performance of one or more threads of two or more wavefronts that were concurrently executed by the processor core 114. For example, results 605 includes primitives, constants, variables, and the like. In embodiments, results 605 are stored in a data structure in the LDS 116 having a respective element assigned to each thread of the two or more wavefronts that were concurrently executed by the processor core 114. For example, each result 605 resulting from the execution of a corresponding thread stored in the respective element of the data structure in the LDS 116 assigned to the thread.

In embodiments, example operation 600 includes the memory unit 118 retrieving the compaction masks 110 associated with the wavefronts concurrently executed to produce results 605. For example, the memory unit 118 retrieves the compaction masks 110 from one or more registers 332 of the memory unit 118. After retrieving the compaction masks 110, compaction circuitry 336 of the memory unit 118 is configured to combine the retrieved compaction masks 110 to produce a combined compaction mask 315. The combined compaction mask 315, for example, includes an element for each thread in the waves concurrently executed to produce results 605 with each element including data (e.g., a bit) indicating whether a corresponding thread is to have compacted data transferred between system memory 106 and an LDS 116. As an example, the combined compaction mask 315 includes a bit for each thread of the waves concurrently executed to produce results 605 with each bit having a first value (e.g., 1) indicating that a corresponding thread is to have compacted data transferred between system memory 106 and an LDS 116 and each bit having a second value (e.g., 0) indicating that a corresponding thread is not to have compacted data transferred between system memory 106 and an LDS 116.

Based on combined compaction mask 315, compaction circuitry 334 then determines which data from results 605 to store in system memory 106. For example, compaction circuitry 334 determines the elements in the combined compaction mask 315 that indicate a corresponding thread is to have compacted data transferred between system memory 106 and an LDS 116. Based on the elements in the combined compaction mask 315 that indicate a corresponding thread is to have compacted data transferred between system memory 106 and an LDS 116, compaction circuitry 334 determines that results 605 resulting from the performance of the threads corresponding to the elements in the combined compaction mask 315 indicating a corresponding thread is to have compacted data transferred between system memory 106 and an LDS 116 are to be written to system memory 106. As an example, compaction circuitry 336 identifies the elements of the data structure in the LDS 116 assigned to the threads that are to have compacted data transferred between system memory 106 and an LDS 116 as indicated by the elements in the combined compaction mask 315. Compaction circuitry 336 then determines that the results 605 stored in the identified elements of the data structure in the LDS 116 are to be written to system memory 106 as compacted data 120.

Once compaction circuitry 334 identifies the results 605 to be written to system memory 106, compaction circuitry 334 then determines a respective destination 645 within system memory 106 for each result 605 to be written to system memory 106. A destination 645, for example, represents a memory address within system memory 106. As an example, to determine a respective source 345 for the result 605 in the Nth element of the data structure in the LDS 116, compaction circuitry 334 first determines a prefix sum 325 for the Nth element of the combined compaction mask 315 that indicates a corresponding thread is to have data transferred between system memory 106 and an LDS 116. Based on the determined prefix sum 325, compaction circuitry 334 then determines a destination 645 in system memory 106 by, for example, adding the determined prefix sum 325 to an initial memory address of a data structure in system memory 106. According to some embodiments, compaction circuitry 334 is configured to determine a destination 645 further based on a predetermined stride value indicated, for example, in a set of instructions (e.g., set of instructions 305). For example, compaction circuitry 334 is configured to multiply the prefix sum 325 by a predetermined stride value before adding the prefix sum 325 (e.g., as multiplied by the predetermined stride value) to an initial memory address of a data structure of system memory 106.

After determining the destinations 645 for the results 605 to be written to system memory 106, memory unit 118 writes the results 605 to the corresponding destinations 645 in system memory 106 to produce compacted data 615 (e.g., data stored in a data structure having no empty elements). According to some embodiments, to write results 605 to system memory 106, the memory unit 118 is configured to combine two or more memory transactions based on the determined destinations 645. For example, based on two or more of the determined destinations 645 being consecutive memory addresses in system memory 106, the memory unit 118 combines each memory transaction configured to write to one of the consecutive memory addresses into a single memory transaction. By combining the memory transactions based on determined destinations 645 being consecutive memory addresses in system memory 106, the memory unit 118 reduces the number of memory transactions needed to write the results 605 to system memory 106, helping to reduce the time and resources needed to write the results 605 as compacted data 120 in system memory 106.

In embodiments, the memory unit 118 is configured to flush one or more memory transaction queues, caches, or both when writing compacted data 120 from an LDS 116 to system memory 106. For example, in some embodiments, the memory unit 118 generates one or more memory transactions to write compacted 120 data from an LDS 116 to system memory 106 and stores these memory transactions in one or more memory transaction queues. Further, the memory unit 118 is configured to flush the memory transaction queues storing these memory transactions based on writing compacted data 120 from an LDS 116 to system memory 106. For example, once the memory unit 118 begins writing compacted data 120 from an LDS 116 to one or more destinations 645 in system memory 106, the memory unit 118 is configured to flush one or more of the queues storing such memory transactions. Additionally, in some embodiments, the memory unit 118 is configured to flush one or more caches based on writing compacted data 120 from an LDS 116 to system memory 106. For example, based on writing compacted data 120 from an LDS 116 to one or more destinations 645 in system memory 106, the memory unit 118 is configured to flush one or more caches (e.g., AU 112 caches) that store a compacted representation of the compacted data 120 to be written at the destinations 645.

Figure 7:
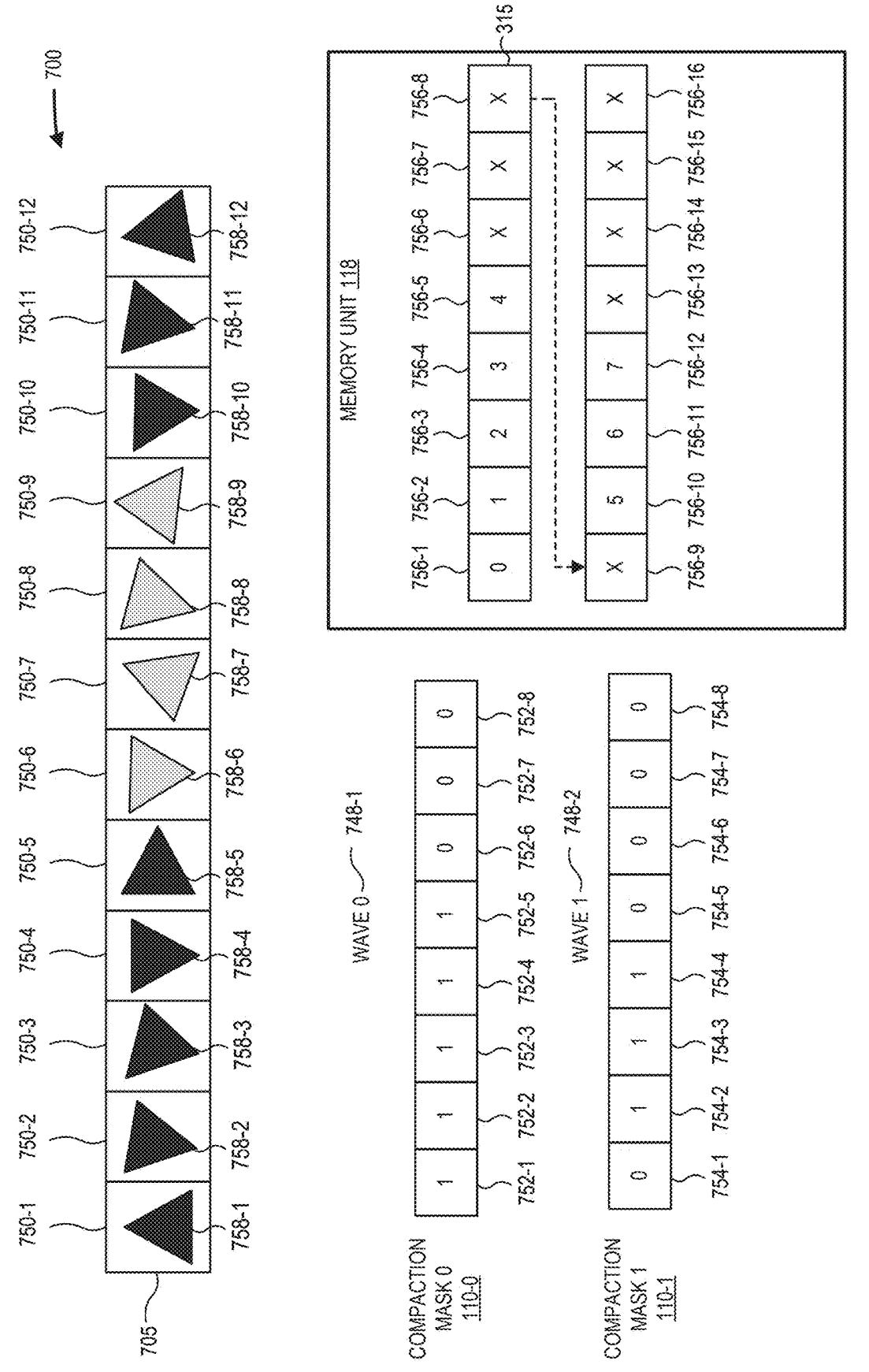
FIG. 7 is a flow diagram illustrating an example operation for compacting primitive data stored in an LDS using a combined compaction mask, in accordance with some embodiments.

Referring now to FIG. 7, an example operation 700 for compacting primitive data stored in an LDS using a combined compaction mask is presented, in accordance with embodiments. In embodiments, example operation 700 is implemented in processing system 100 by a memory unit 118 of AU 112. In embodiments, example operation 700 includes one or more compute units concurrently executing two waves (e.g., wave 0 748-1 and wave 1 748-2) each having eight threads to be executed. Though the example embodiment of FIG. 7 presents each wave 748 as including eight threads, in other embodiments, each wave 748 can include any number of threads. Based on a thread of wave 0 748-1 or wave 1 748-2 being executed by a compute unit, the compute unit writes data representing a respective primitive 758 to a portion of an LDS 116 assigned to the thread. For example, the compute unit writes data representing a respective primitive 758 to an element 750 of a data structure 705 in LDS 116 assigned to the executed thread. Referring to the example embodiment presented in FIG. 7, the compute units concurrently execute the threads of wave 0 748-1 and wave 1 748-2 such that primitive 758-1 is written to element 750-1 of the data structure 705 in the LDS 116, primitive 758-2 is written to element 750-2, primitive 758-3 is written to element 750-3, primitive 758-4 is written to element 750-4, primitive 758-5 is written to element 750-5, primitive 758-6 is written to element 750-6, primitive 758-7 is written to element 750-7, primitive 758-8 is written to element 750-8, primitive 758-9 is written to element 750-9, primitive 758-10 is written to element 750-10, primitive 758-11 is written to element 750-11, and primitive 758-12 is written to element 750-12. Though the example embodiment in FIG. 7 presents the compute units writing 12 primitives 758 to a data structure 705 in an LDS 116, in other embodiments, the compute units can write any number of primitives to the data structure 705 when executing the waves.

According to embodiments, example operation 600 includes memory unit 118 writing at least a portion of the primitives 758 in data structure 705 as compacted data 120 in system memory 106 (e.g., such as for export to a rasterizer). For example, in embodiments, memory unit 118 is configured to only write visible primitives (e.g., primitives to be rasterized) to system memory 106. As an example, memory unit 118 is configured to write data representing visible primitives 758-1, 758-2, 758-3, 758-4, 758-5, 758-10, 758-11, and 758-12 (represented in FIG. 7 with dark shading) to system memory 106 and not write data representing non-visible primitives 758-6, 758-7, 758-8, 758-9 (represented in FIG. 7 with light shading) to system memory 106. To this end, the memory unit 118 is configured to first retrieve the compaction masks 110 associated with wave 0 748-1 and wave 1 748-2 from, for example, the register 332 of the memory unit 118. The memory unit 118 then combines the retrieved compaction masks 110 to produce a combined compaction mask 315.

As an example, the memory unit 118 retrieves the first compaction mask 0 110-1 and the second compaction mask 1 110-2 from one or more registers 332 of the memory unit 118. The first compaction mask 0 110-1 includes a number of elements (e.g., 752-1, 752-2, 752-3, 752-4, 752-5, 752-6, 752-7, 752-8) corresponding to the number of threads in wave 0 748-1 with each element 752 including data (e.g., a bit) indicating whether a corresponding thread of wave 0 748-1 is to have compacted data transferred between system memory 106 and an LDS 116. As an example, elements 752-1, 752-2, 752-3, 752-4, and 752-5 include data having a first value (e.g., 1) indicating a corresponding thread is to have compact data transferred between the system memory 106 and an LDS 116 and elements 752-6, 752-7, and 752-8 include data having a second value (e.g., 0), different from the first value, indicating a corresponding thread is to not have compact data transferred between the system memory 106 and an LDS 116. Further, the second compaction mask 1 110-2 includes a number of elements (e.g., 754-1, 754-2, 754-3, 754-4, 754-5, 754-6, 754-7, 754-8) corresponding to the number of threads in wave 1 748-2 with each element 754 including data (e.g., a bit) indicating whether a corresponding thread of wave 1 748-2 is to have compacted data transferred between system memory 106 and an LDS 116. As an example, elements 754-2, 754-3, and 754-4 include data having a first value (e.g., 1) indicating a corresponding thread is to have compact data transferred between the system memory 106 and an LDS 116 and elements 754-1, 754-5, 754-6, 754-7, and 754-8 include data having a second value (e.g., 0), different from the first value, indicating a corresponding thread is to not have compact data transferred between the system memory 106 and an LDS 116. A person of skill in the art will appreciate that, in other embodiments, the number of elements 752 in the first compaction mask 0 110-1 and the number of elements 754 in the second compaction mask 1 110-2 will vary based on the number of threads in wave 0 748-1 and wave 1 748-2, respectively.

Further, as an example, memory unit 118 combines the first compaction mask 0 110-1 with the second compaction mask 1 110-2 to form a combined compaction mask 315. As an example, the memory unit 118 combines the first compaction mask 0 110-1 with the second compaction mask 1 110-2 such that the combined compaction mask 315 has a first number of elements representing the data in the elements the first compaction mask 0 110-1 and a second number of elements representing the data in the elements of the second compaction mask 1 110-2. Referring to the example embodiment presented in FIG. 6, combined compaction mask 315 includes elements 756-1, 756-2, 756-3, 756-4, 756-5, 756-6, 756-7, and 756-8 each representing the data in respective elements 752-1, 752-2, 752-3, 752-4, 752-5, 752-6, 752-7, and 752-8 of the first compaction mask 0 110-1. Additionally, combined compaction mask 315 includes elements 756-9, 756-10, 756-11, 756-12, 756-13, 756-14, 756-15, and 756-16 each representing the data in respective elements 754-1, 754-2, 754-3, 754-4, 754-5, 754-6, 754-7, and 754-8 of the second compaction mask 1 110-2.

According to embodiments, example operation 700 includes the memory unit 118 determining respective destinations 645 in system memory 106 in which to store each visible primitive 758. To this end, the memory unit 118 first determines prefix sums 325 for each element of the combined compaction mask 315 that includes data (e.g., a first value) indicating a corresponding thread is to have compacted data transferred between system memory 106 and an LDS 116. Referring to the example embodiment presented in FIG. 7, the memory unit 118 is configured to determine a first prefix sum 325 for element 756-1 of combined compaction mask 315, a second prefix sum 325 for element 756-2, a third prefix sum 325 for element 756-3, a fourth prefix sum 325 for element 756-4, a fifth prefix sum 325 for element 756-5, a sixth prefix sum 325 for element 756-10, a seventh prefix sum 325 for element 756-11, and an eighth prefix sum 325 for element 756-12. After determining the prefix sums 325, memory unit 118 then determines a respective destination 645 in system memory 106 for each visible primitive 758. For example, for a primitive 758 stored in an Nth element 752 of the data structure 705 in the LDS 116, memory unit 118 combines an initial memory address of a data structure in system memory 106 with the prefix sum 325 determined for the Nth element of the combined compaction mask 315 having data indicating a corresponding thread is to have compacted data transferred between system memory 106 and the LDS 116. For example, to determine a destination 645 for the first visible primitive 758-1 stored in the data structure 705, the memory unit 118 combines the prefix sum 325 determined for the element 756-1 of the combined compaction mask 315 with an initial memory address in system memory 106. As another example, to determine a destination 645 for the sixth visible primitive 758-10 stored in the data structure 705, the memory unit 118 combines the prefix sum 325 determined for the element 756-10 of the combined compaction mask 315 with an initial memory address in system memory 106. After determining a respective destination 645 for each visible primitive 758, the memory unit 118 writes data representing the visible primitives 758 to the corresponding destinations 645 in system memory 106 as compacted data 120 (e.g., data stored in a data structure with no empty elements).

Figure 8:
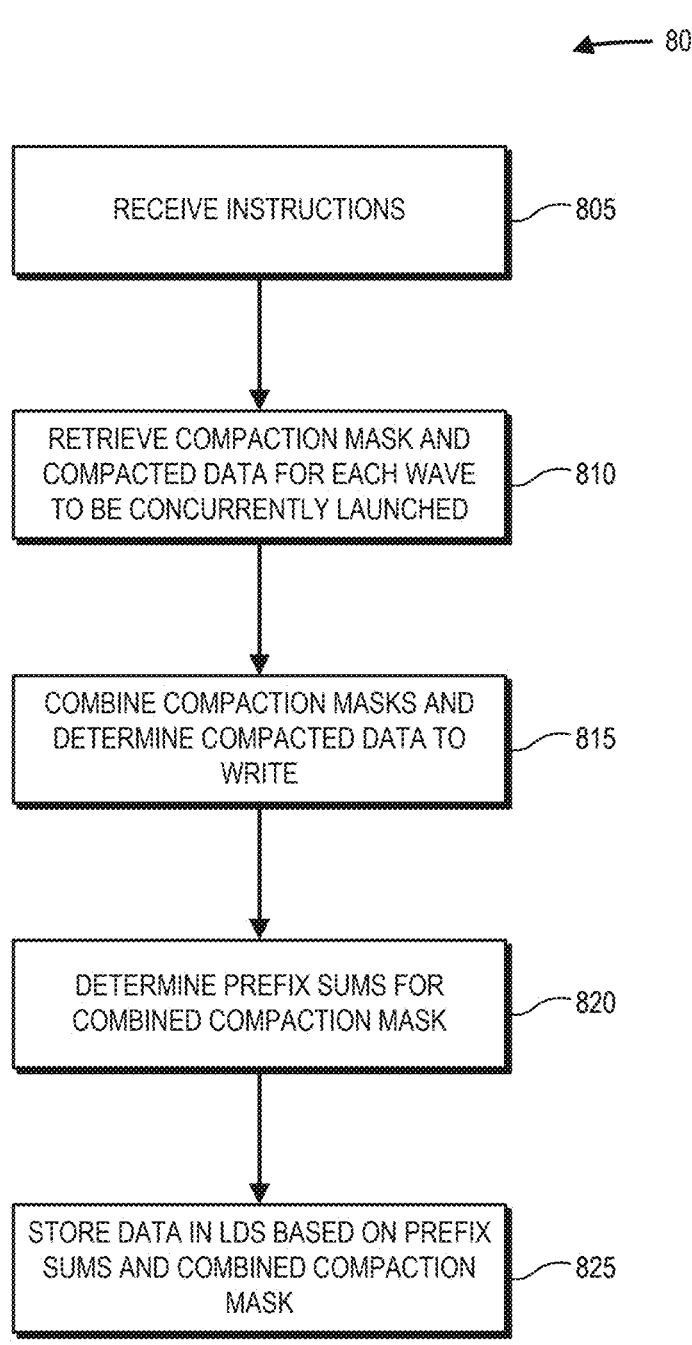
FIG. 8 is a flow diagram illustrating an example method for compacted memory transactions between an LDS and a memory, in accordance with embodiments.

Referring now to FIG. 8, an example method 800 for compacted memory transactions between an LDS and a memory is presented, in accordance with embodiments. According to embodiments, example method 800 is implemented by AU 112 of processing system 100. At block 805 of example method 800, a processor core 114 of AU 112 operation as one or more compute units (e.g., compute units 226) is configured to receive a set of instructions (e.g., set of instructions 305). The set of instructions, for example, indicates one or more waves to be concurrently performed by the compute units with each wave including a number of threads to be executed. Further, the set of instructions indicates one or more compaction masks 110 for each indicated wave. A compaction mask 110 for a wave, for example, includes a number of elements equal to the number of threads in the wave. Further, each element of the compaction mask 110 includes data (e.g., a bit) indicating indicate whether compacted data is to be transferred between the system memory 106 and an LDS 116 for a corresponding thread of the wave. According to embodiments, after receiving the set of instructions, a memory unit 118 of AU 112 stores one or more compaction masks 110 indicated in the set of instructions in one or more registers of the memory unit 118.

At block 810, the memory unit 118 is configured to write compacted data (e.g., compacted data 120) from system memory 106 to an LDS 116 included or otherwise connected to the compute units. To this end, the memory unit 118 first retrieves the compaction masks 110 for each wave to be concurrently executed by the compute units. That is to say, the memory unit 118 retrieves a respective compaction mask 110 for each wave to be concurrently launched by the compute units. After retrieving the compaction masks 110, at block 815, the memory unit 118 combines the retrieved compaction masks 110 to form a combined compaction mask 315. Such a combined compaction mask 315, for example, includes an element for each thread in the waves to be concurrently executed with each element including data (e.g., a bit) indicating whether a corresponding thread of the waves is to have compacted data transferred between system memory 106 and an LDS 116. Further, at block 815, the memory unit 118 identifies a number of elements (e.g., elements 438) of a data structure (e.g., data structure 405) stored in system memory 106 from which to write data to the LDS 116 based on the combined compaction mask 315 (e.g., based on two or more compaction masks 110). For example, the memory unit 118 first determines the number of elements in the combined compaction mask 315 that include data indicating a corresponding thread is to have compacted memory transferred between system memory 106 and the LDS 116. The memory unit 118 then identifies a number of elements of a data structure in system memory 106 equal to the number of elements in the combined compaction mask 315 that include data indicating a corresponding thread is to have compacted memory transferred between system memory 106 and the LDS 116. As an example, memory unit 118 identifies sequential elements of the data structure in system memory 106 equal to the number of elements in the combined compaction mask 315 that include data indicating a corresponding thread is to have compacted memory transferred between system memory 106 and the LDS 116.

At block 820, the memory unit 118 is configured to determine respective sources 345 in the system memory 106 from which to load data to each identified elements in the LDS 116 indicated to receive compacted data based on the combined compaction mask 315 (e.g., based on two or more compaction masks 110). To this end, the memory unit 118 is configured to determine a prefix sum 325 for each element of the combined compaction mask 315 that includes data indicating a corresponding thread is to have compacted data transferred between system memory 106 and the LDS 116. To determine a source 345 in the system memory 106 from which to load data in the Nth element of the LDS 116 indicated to receive compacted data, the memory unit 118 combines an initial memory address of a data structure in the system memory 106 with the prefix sum 325 determined for the Nth element of the combined compaction mask 315 that includes data indicating a corresponding thread is to have compacted data transferred between system memory 106 and the LDS 116. After determining respective sources 345 in the elements of the data structure in system memory 106, the memory unit 118, at block 825, stores the data in the LDS 116 based on the prefix sums and combined compaction mask 315. For example, the memory unit 118 loads the data from the identified sources 345 in system memory 106 to corresponding elements within the LDS 116.

In some embodiments, the apparatus and techniques described above are implemented in a system including one or more integrated circuit (IC) devices (also referred to as integrated circuit packages or microchips), such as the AU described above with reference to FIGS. 1-8. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An accelerator unit (AU), comprising:
one or more compute units configured to execute a first group of threads and a second group of threads; and
a memory unit connected to the one or more compute units and configured to:
identify compacted data in a memory based on two or more compaction masks, a first compaction mask of the two or more compaction masks including elements corresponding to the first group of threads and a second compaction mask of the two or more compaction masks including elements corresponding to the second group of threads; and store the compacted data in a local data share based on the two or more compaction masks.

2. The AU of claim 1, wherein the memory unit is configured to identify the compacted data by:
combining the two or more compaction masks to produce a combined compaction mask; and
identifying an element of a data structure based on the combined compaction mask.

3. The AU of claim 2, wherein the memory unit is configured to store the compacted data by:
determining one or more prefix sums based on the combined compaction mask; and
identifying one or more sources in the memory based on the one or more prefix sums.

4. The AU of claim 3, wherein the memory unit is configured to store the compacted data by:
loading the compacted data at the one or more sources to the local data share.

5. The AU of claim 4, wherein the memory unit is configured to load the compacted data by:
combining one or more memory transactions based on the one or more sources.

6. The AU of claim 1, wherein the memory unit includes one or more registers configured to store the two or more compaction masks.

7. The AU of claim 1, wherein the one or more compute units are configured to concurrently execute the first group of threads and the second group of threads.

8. A method, comprising:
identifying, at a memory unit, compacted data in a memory based on two or more compaction masks associated with a received set of instructions, a first compaction mask of the two or more compaction masks including elements corresponding to a first group of threads indicated by the set of instructions and a second compaction mask of the two or more compaction masks including elements corresponding to a second group of threads indicated by the set of instructions; and
storing the compacted data in a local data share based on the two or more compaction masks.

9. The method of claim 8, wherein identifying the compacted data comprises:
combining the two or more compaction masks to produce a combined compaction mask; and
identifying an element of a data structure based on the combined compaction mask.

10. The method of claim 9, wherein storing the compacted data comprises:
determining, at the memory unit, one or more prefix sums based on the combined compaction mask; and
identifying one or more sources in the memory based on the one or more prefix sums.

11. The method of claim 10, wherein storing the compacted data further comprises:
loading the compacted data at the one or more sources to the local data share.

12. The method of claim 11, wherein storing the compacted data further comprises:
combining one or more memory transactions based on the one or more sources.

13. The method of claim 8, wherein the memory unit includes one or more registers configured to store the two or more compaction masks.

14. The method of claim 8, wherein the first group of threads is executed concurrently with the second group of threads.

15. A processing system comprising:

a first processing unit configured to send a set of instructions; and a second processing unit, comprising:

one or more compute units configured to execute a first group of threads and a second group of threads for the set of instructions; and a memory unit connected to the one or more compute units and configured to:

identify results in a local data share to be written to a system memory based on two or more compaction masks associated with the set of instructions, a first compaction mask of the two or more compaction masks including elements corresponding to the first group of threads and a second compaction mask of the two or more compaction masks including elements corresponding to the second group of threads; and store the results in the system memory based on the two or more compaction masks.

16. The processing system claim 15, wherein the memory unit is configured to identify the results in the local data share by:

combining the two or more compaction masks to produce a combined compaction mask; and identifying an element of a data structure in the local data share based on the combined compaction mask.

17. The processing system of claim 16, wherein the memory unit is configured to store the results by:

determining one or more prefix sums based on the combined compaction mask; and identifying one or more destinations in the system memory based on the one or more prefix sums.

18. The processing system of claim 17, wherein the memory unit is configured to store the results by:

storing the results in a data structure in the system memory, wherein the data structure does not include an empty element.

19. The processing system of claim 18, wherein the memory unit is configured to store the results by:

combining one or more memory transactions based on the one or more destinations.

20. The processing system of claim 15, wherein the memory unit includes one or more registers configured to store the two or more compaction masks.

* * * * *